(12) United States Patent
Gerstel

(10) Patent No.: US 7,054,262 B2
(45) Date of Patent: May 30, 2006

(54) LINE-LEVEL PATH PROTECTION IN THE OPTICAL LAYER

(75) Inventor: Ornan Gerstel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/809,987

(22) Filed: Mar. 26, 2004

(65) Prior Publication Data

US 2005/0213508 A1    Sep. 29, 2005

(51) Int. Cl.
*H04L 12/16* (2006.01)

(52) U.S. Cl. .............. 370/216; 370/221; 370/242; 370/408

(58) Field of Classification Search ........ 370/216, 370/217, 219, 242, 907, 395, 408, 221, 222, 370/225, 227, 228
See application file for complete search history.

(56) References Cited

U.S. PATENT DOCUMENTS

| 5,729,527 | A | 3/1998 | Gerstel et al. |
| 5,793,746 | A | 8/1998 | Gerstel et al. |
| 6,256,293 | B1 | 7/2001 | Gerstel et al. |
| 6,324,162 | B1 | 11/2001 | Chaudhuri |
| 6,785,225 | B1* | 8/2004 | Sugawara et al. .......... 370/225 |
| 6,810,011 | B1* | 10/2004 | Betts .......................... 370/228 |
| 2001/0043563 | A1 | 11/2001 | Gerstel et al. |
| 2002/0071154 | A1 | 6/2002 | Gerstel et al. |
| 2002/0101631 | A1 | 8/2002 | Gerstel et al. |

OTHER PUBLICATIONS

ITU-T, G.841, Series G: Transmission Systems and Media, Digital Systems and Networks, Digital transmission systems—Digital networks—SDH network characteristics, Types and characteristics of SDH network protection architectures, Oct. 1998.

* cited by examiner

*Primary Examiner*—Chi Pham
*Assistant Examiner*—Alexander O. Boakye
(74) *Attorney, Agent, or Firm*—Aka Chan LLP

(57) ABSTRACT

Systems and methods provide very fast protection switching while leaving selected traffic unprotected. When a link fails, only certain pre-selected paths are rerouted at the point of failure. Other traffic is left unprotected or protected at another layer. Signaling of the failure and the rerouting is performed for the link as a whole rather than for the individual paths. Signaling occurs at a first layer of a digital transmission hierarchy while path rerouting switching occurs at a second hierarchical layer above the first layer. In certain implementations, K1/K2 bytes are used in signaling at the optical line layer (OC-n), while only protected High-Order paths (STS) and Low-Order paths (VT) are protected by the protection switch.

29 Claims, 5 Drawing Sheets

LINE-LEVEL PATH PROTECTION IN THE OPTICAL LAYER

BACKGROUND OF THE INVENTION

The present invention relates to data networking and more particularly to systems and methods for protecting against failure.

Hierarchical digital transmission standards such as SONET, SDH, and G.709 are commonly used in optical service provider networks. These standards define multiple layers of a transmission hierarchy where each layer represents transmission at a particular data rate. Multiple lower bandwidth transmission signals of one hierarchical layer can be multiplexed together to form a higher bandwidth transmission signal at a lower hierarchical layer. A higher hierarchical layer thus contains signals that are more finely granulated in bandwidth than a lower layer.

To provide high quality of service, networks employing such digital transmission standards require mechanisms to quickly respond to failures. To avoid disruption of data flow and preserve the user experience of voice and video services, it is desirable to reroute traffic affected by a link failure within 50 milliseconds. Numerous protection mechanisms have been developed in pursuit of this ideal.

Increasingly hierarchical digital transmission standard-based networks are being used to carry packet-based traffic such as IP traffic and also MPLS traffic. The hierarchical digital transmission standards can be said to operate at the optical layer (which includes the hierarchical transmission rate layers referred to above), whereas IP and MPLS are client layer protocols that exploit optical layer communication facilities. MPLS Traffic Engineering is an increasingly important technique for carrying traffic for which quality of service must be guaranteed. A set of techniques referred to as MPLS Fast Reroute has been developed to provide failure protection for MPLS Traffic Engineering tunnels. These protection mechanisms operate at the client layer whereas the protection mechanisms associated with the hierarchical digital transmission standards referred to above are associated with the optical layer.

Problems arise due to interactions between failure protection mechanisms operating at the different layers. It is desirable to inhibit the operation of optical layer protection mechanisms for traffic that is already protected at the client layer by a mechanism such as MPLS Fast Reroute. One way to accomplish this differential protection at the optical layer is to segregate protected traffic and unprotected traffic among different fibers or different wavelengths. This is extremely wasteful of transmission capacity.

Another prior art approach allows protected and unprotected traffic to share a link. When a failure occurs traffic is rerouted only for those paths that both employ the link and carry protected traffic. The traffic is rerouted at the endpoints of the path rather than at the point of failure. This approach requires the path restoration signaling to be done on a per-path basis between the points of failure and the path endpoints. Because there may be numerous protected paths with disparate endpoints, the signaling burden makes it difficult to achieve the objective of achieving rerouting of protected traffic within 50 milliseconds.

Yet another approach, limited to a ring topology, accomplishes its signaling at the link layer to reduce signaling traffic, but provides end-to-end restoration of protected paths. This approach relies on flooding signaling information around the ring and thus will not work in a mesh network where such flooding is impractical. Also, restoration is slowed somewhat by the need to signal failure all the way to the path endpoints.

What is needed are systems and methods for providing differential protection to traffic at the optical layer without incurring the drawbacks discussed above.

SUMMARY OF THE INVENTION

Embodiments of the present invention provide very fast protection switching while leaving selected traffic unprotected. When a link fails, only certain pre-selected paths are rerouted at the point of failure. Other traffic is left unprotected or protected at another layer. Signaling of the failure and the rerouting is performed for the link as a whole rather than for the individual paths. Signaling occurs at a first layer of a digital transmission hierarchy while path rerouting switching occurs at a second hierarchical layer above the first layer. In certain implementations, K1/K2 bytes are used in signaling at the optical line layer (OC-n), while only protected High-Order paths (STS) and Low-Order paths (VT) are protected by the protection switch.

One aspect of the present invention provides a method of operating a node to handle link failure in a network employing a hierarchical digital transmission standard. The method includes: detecting failure of a data communication link, wherein the link is employed by a plurality of paths defined at a first hierarchical layer, signaling local repair of the failure using overhead information of a second hierarchical layer below the first hierarchical layer; and switching only protected ones of the plurality of paths to alternate routes through the network to avoid the failure.

Further understanding of the nature and advantages of the inventions herein may be realized by reference to the remaining portions of the specification and the attached drawings.

DESCRIPTION OF SPECIFIC EMBODIMENTS

The present invention will be described with reference to a specific example, a mesh network employing a hierarchical digital transmission standard. In the example as described herein, the hierarchical digital transmission standard is the SONET standard although the present invention is also readily applicable to other well-known standards such as SDH and G.709. Transmission in accordance with SONET, SDH, or G.709 is described in various standards and specifications published by the ITU, ETSI, ANSI, and Telcordia (formerly Bellcore), the contents of which are herein incorporated by reference in their entirety.

Figure 1:
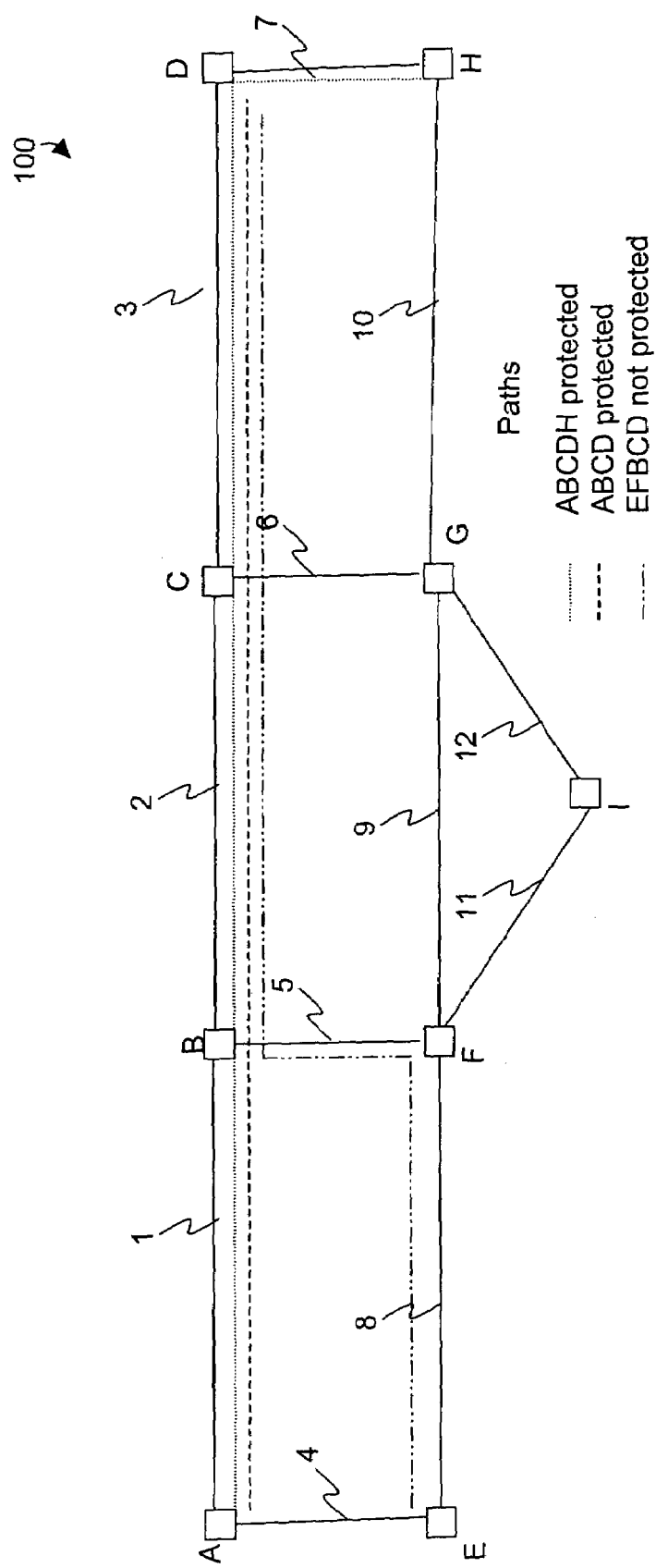
FIG. 1 depicts a mesh network to which embodiments of the present invention may be applied.

A mesh network to which embodiments of the present invention may be applied is depicted in FIG. 1. A mesh network 100 includes nodes A-I interconnected by links 1–12. Each link is assumed to be bidirectional. In the implementation to be described herein, each link represents OC-n, e.g., OC-48, communications, i.e., a payload data rate of approximately 2.4 Gbps. The OC-48 signal transmitted along the link includes 48 multiplexed STS-1 signals with a payload of approximately 50 Mbps each. Data is transferred through the mesh network over so-called paths. Each path traverses a number of links and nodes in the network. In the example to be described, multiple paths may incorporate the same link, each being assigned a different STS-1 channel. On a given link, some STS-1 channels may be reserved for end-to-end paths while others are reserved for carrying traffic that is being rerouted around a link failure. This example is merely representative. For example, the link may be, e.g., an OC-192 or OC-768 link.

Three representative paths employ STS-1 channels on link 2 from node B to node C. Paths ABCDH and ABCD are protected while path EFBCD is not protected. Counterpart paths in the reverse direction are also present. Of course this will be understood to be a simplified example. It is possible to have many more protected paths and/or unprotected paths employing a single link. A pre-configured protection route for a failure of link 2 extends through nodes B, F, I, G, and C.

Figure 2:
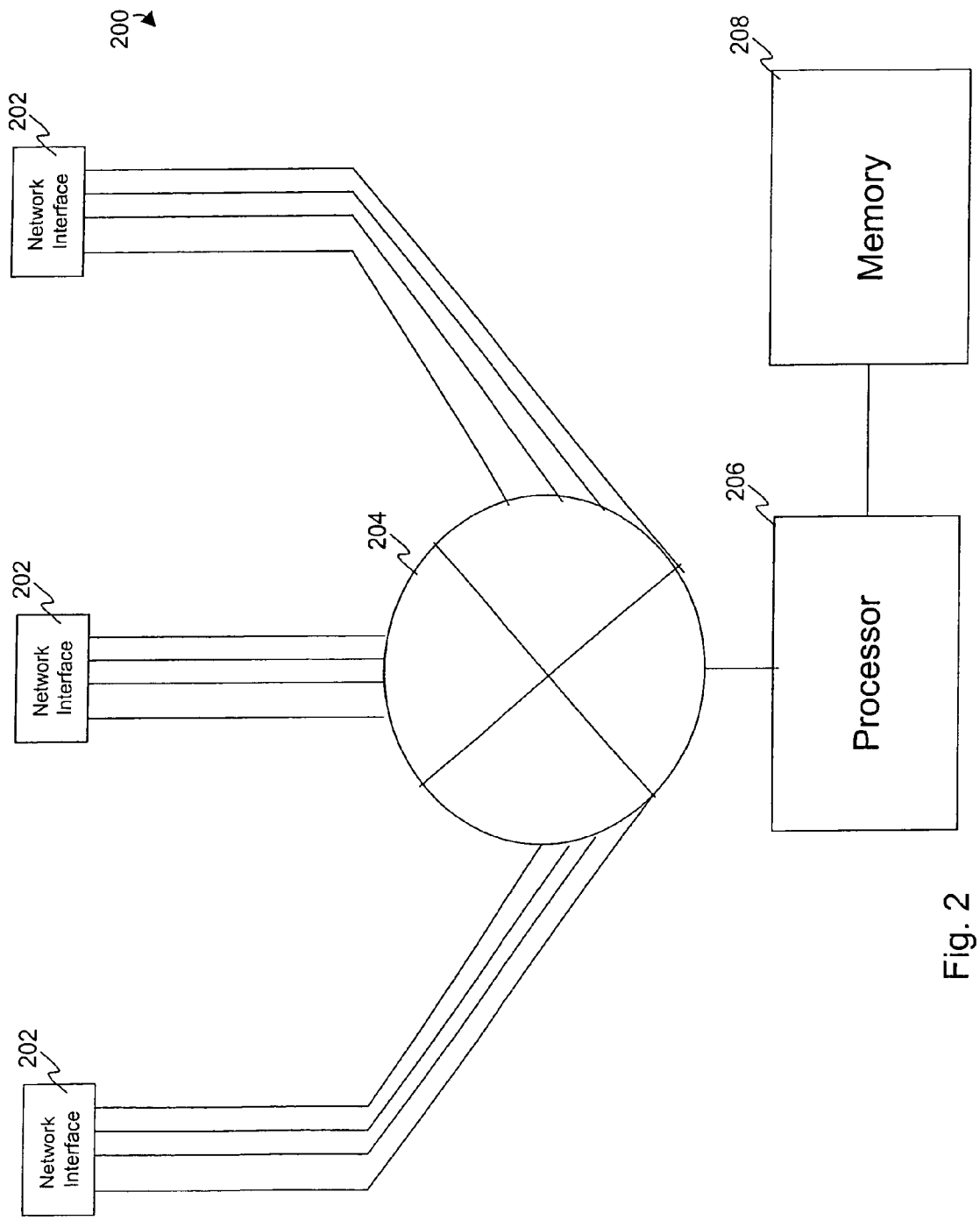
FIG. 2 depicts a network device useful in implementing embodiments of the present invention.

FIG. 2 depicts a representative network device 200 that may be used to implement nodes of mesh network 100. A network interface 202 is provided for each link to which the node connects. Each network interface 202 incorporates the necessary optical interface components including an appropriate laser and photodiode, circuitry for recovering digital data streams and for modulating digital data onto a transmitted signal, and appropriate circuitry for mapping STS-1 data streams into an OC-48 signal and for demapping STS-1 data streams from a received OC-48 signal.

Individual STS-1 signals received and transmitted by the network interfaces 202 are interconnected by a cross-connect 204. Cross-connect 204 is capable of connecting any received STS-1 signal to any desired STS-1 slot on any transmitted OC-48 signal. The cross-connection state of cross-connect 204 is configured by a processor 206.

Processor 206 also receives and generates overhead information that may be included with the individual STS-1 signals as well as the overall OC-48 signals. Processor 206 controls signaling and switching operations to implement embodiments of the present invention. Processor 206 executes software that would be stored in a computer-readable storage medium such as a memory 208. Other examples of a storage medium that may hold instructions for execution by processor 206 include, e.g., CD-ROMS, DVD-ROMS, floppy disks, a signal received over the Internet, etc. Functionality of processor 206 may be divided among multiple processors or may be implemented all or in part by integrated circuits such as FPGAs, ASICs, etc.

Figure 3:
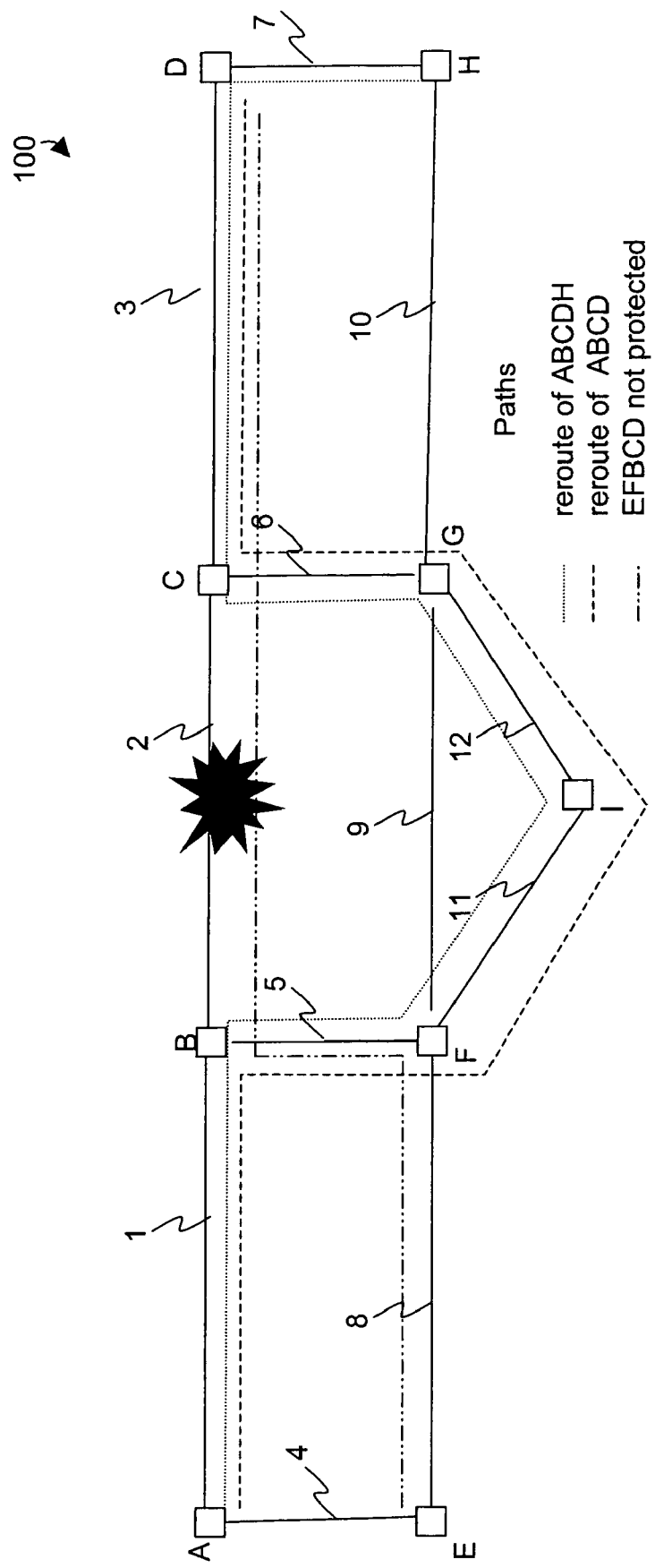
FIG. 3 is a flow chart describing steps of a mesh network protection scheme according to one embodiment of the present invention.

FIG. 3 depicts a protection scenario useful in describing embodiments of the present invention. FIG. 3 depicts the same mesh network 100 as in FIG. 1, with a failure on link 2. The previously mentioned three representative paths are impacted by the failure on link 2 from node B to node C. Paths ABCDH and ABCD are protected and have been rerouted along the preconfigured protection route to circumvent the failed link 2, while path EFBCD remains routed along link 2 since it is not protected.

Figure 4:
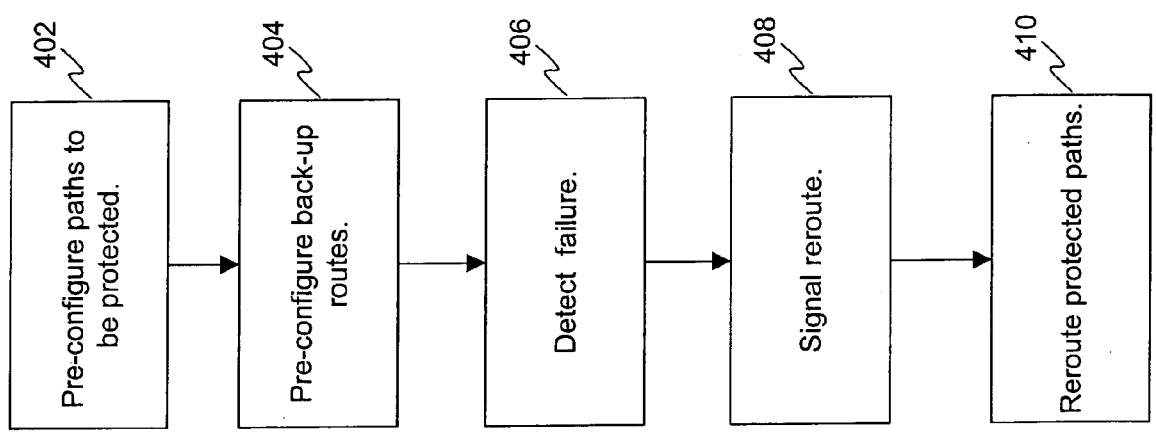
FIG. 4 depicts a mesh network failure scenario according to one embodiment of the present invention.

FIG. 4 is a flow chart describing steps of operation according to one embodiment of the present invention. At step 402, the paths to be protected are pre-configured as protected paths at the nodes they traverse. This may be part of the process of distributing and configuring path information at the various nodes. In one embodiment, a path computation server (not shown) computes the needed paths using an appropriate algorithm such as ones based on the well-known Dijkstra algorithm. The path computation server tells each node which paths are traversing it, which links are being employed for each path, and which channel is being used for a given path on the inbound link and the outbound link. Each node is also made aware of which traversing paths are to be protected and which are to be left unprotected.

Step 404 pre-configures backup routes for the paths to be protected. Each link with protected paths has a protection route (typically one but possibly more) onto which protected traffic will be locally diverted in case of a failure. These protection routes may be computed by the path computation server referred to above and sent to the nodes of the mesh network. Alternatively, the protection route may be computed locally based on an understanding of the mesh network topology. Specifying the protection route will involve specifying the included nodes and links and the STS-1 channels to be used on each link. Sufficient aggregate bandwidth should be allocated to accommodate all of the protected traffic. For example, the protection route may reserve as many channels on each included link as there are protected paths. An individual channel may be allocated to multiple protection routes configured to handle independent failures. The endpoint nodes and intermediate nodes of a protection route should be aware of the channel assignments so that they can appropriately configure their cross-connects in the event of a failure. The protection routes implement local repair around a failed link rather than an end-to-end reroute of a path including a failed link.

In normal operation, traffic flows through the protected and unprotected paths. Assume that a failure occurs that disrupts all of the communication on link 2 between nodes B and C. This failure is detected at step 406. An indication of failure is then signaled between nodes B and C at step 408. The signaling traffic goes via the protection route. The signaling is performed within the OC-48 overhead of the links along the protection route rather than within the overhead of individual STS-1 channels. Nodes B and C are aware of which paths will be rerouted in response to the failure based on the pre-configuration of step 402. This greatly saves on the necessary signaling resources.

A step 410 represents the rerouting of the protected paths on the failed link. Node B, for example, will bridge the traffic of the protected paths onto the adjoining link in the protection route. For protected paths that it is receiving, node B will select from the adjoining link of the protection route, rather than from the failed link. Nodes along the protection route will begin selecting rerouted traffic from the previous link of the protection route and forwarding it onto the next link of the protection route.

The rerouted traffic will exploit channels allocated to failure protection on the protection route. Multiple protection routes may be allocated the same channel or channels. Also, channels allocated to protection may be used to carry low priority traffic or manually routed traffic if there is no failure to handle. A prioritization scheme will be used to determine whether traffic to be rerouted will actually displace current traffic. The highest priority is allocated to traffic to be rerouted due to a detected signal failure (SF). Traffic to be rerouted due to detected signal degradation (SD) condition has a lower priority than SF traffic. Unprotected traffic flowing through a protection channel reserved for use of other protected traffic in case of a failure has a lower priority than SD traffic. Manually routed traffic has the lowest priority.

Figure 5:
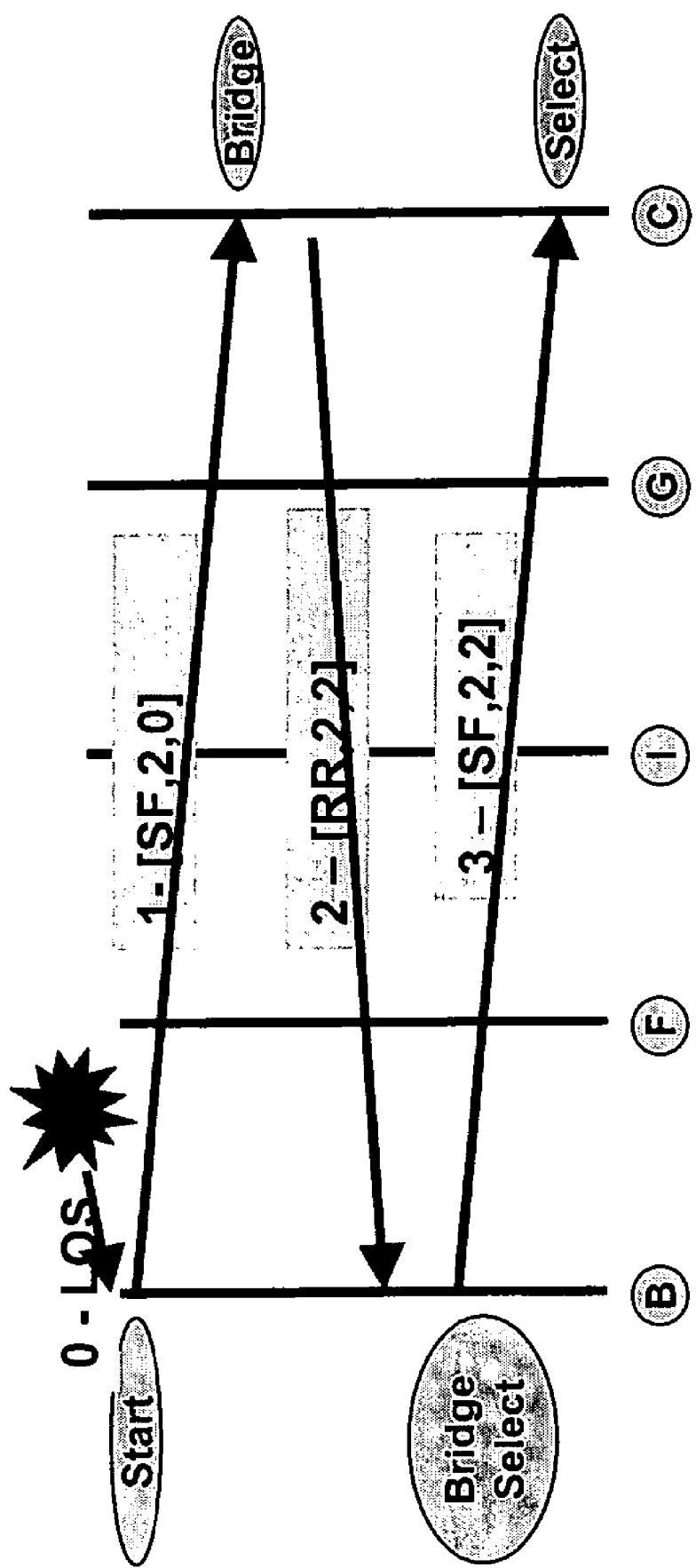
FIG. 5 is a signal flow diagram illustrating signaling according to one embodiment of the present invention.

The signaling and rerouting operations of steps 408 and 410 will be described in greater detail with reference to FIG. 5. Paths ABCDH and ABCD are protected and, in response to the failure, they are rerouted from the failed link 2 to instead traverse nodes BFIGC. FIG. 5 shows the failure detection in rerouting signal flow according to one embodiment of the present invention. These signals are embedded in the K1/K2 bytes within the OC-48 overhead as known in the art. The format of the information communicated in these K1/K2 bytes is: [Action Code: Requesting Link ID: Bridged Path ID]. During normal operation in the absence of a failure there is a constant exchange of K1/K2 bytes on each link. In this normal mode the content of the bytes is [NR,0,0] where NR signifies "No Request."

In FIG. 5, when a failure (e.g., a fiber cut) occurs on the link from node C to node B, node B detects a loss of signal (LOS). In response to the indicated LOS, node B begins the failure and reroute signaling. Node B sends node C a message [SF,2,0] indicating a signal failure (SF) on link 2 and this message is sent along the protection route for link 2. Alternatively, reroute may occur in response to a detected signal degradation (SD) which may be similarly signaled. Intermediate nodes that receive the [SF,2,0] configure their cross-connects to activate the protection route for the protected traffic flowing from node C to node B. Node C responds by bridging the protected traffic that it was sending on link 2 onto link 6.

Node C then sends [RR,2,2]. This indicates a Reverse Request for node B to also bridge and that node C has already bridged the traffic originally slated for link 2. Intermediate nodes that receive the [RR,2,2] configure their cross-connects to activate the protection route for protected traffic falling from node B to node C. Node B then responds by selecting link 5 for the protected traffic it would have received on link 2 and by bridging the protected traffic it would have sent on link 2 onto link 5.

Node B sends [SF,2,2,] to node C to report its own bridging action. Node C responds by selecting to receive the protected paths via link 6. For each bridging and selection operation, nodes B and C take action for all protected traffic affected by the failure and leave any unprotected traffic alone based on the previously configured protection status. The rerouting of numerous protected paths can be accomplished in this way with minimal signaling while preserving granularity in configuring protection. It will also be noted that the signaling is not flooded throughout the mesh network but rather flows only through the nodes of the protection path. The protection scheme, in contrast to ring-based schemes, does not rely upon knowledge of every path being distributed throughout the network.

During the cross-connect configuration steps, care should be taken to avoid misconnecting traffic from the newly protected connection to a connection that was using the same bandwidth for a lower priority purpose (if such a lower priority connection exists). This can be done by dropping traffic at the rerouted path's endpoint when, e.g., the path trace identifier embedded in the STS-1 frame does not match what is expected.

Alternatively, the cross-connect configuration for both directions of transmission can be postponed to be triggered by the [RR,2,2] message instead of one direction being triggered by the [SF,2,0] message. In this alternative embodiment, the [SF,2,0] message only serves to disconnect prior connections that were using the required protection bandwidth, if their priority is lower than SF.

The above description assumes that signaling occurs at the OC-48 layer of the transmission rate hierarchy whereas protection is configured at the STS-1 layer and switching and bridging operations occur at the STS-1 layer. This is only one possible implementation. For example, signaling may be accomplished at the STS-1 layer using the overhead available there while protection may be turned on or off for individual paths that employ VT1.5 channels within the STS-1 signal. The signaling is along the lines described above. In general, signaling can occur at any particular layer in a SONET, SDH, or G.709 hierarchy with protection being granulized to lower bandwidth constituent signals at some layer below the signaling layer. The actual bridging and selecting are then implemented at the lower layer only for the protected paths.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the flowchart steps of FIG. 4 may be deleted, performed in a different order, or combined with other steps. Similarly, the signal flow of FIG. 5 may also be modified.

The invention claimed is:

1. In a mesh network that employs a hierarchical digital transmission standard, a method of operating a node to handle link failure, said method comprising:
   detecting failure of a data communication link at a second hierarchical layer, wherein said link is employed by a plurality of paths defined at a first hierarchical layer above said second hierarchical layer;
   signaling local repair of said failure using overhead information of said second hierarchical layer only without flooding throughout said mesh network; and
   switching only protected ones of said plurality of paths to alternate routes through said network to avoid said failure.

2. The method of claim 1 wherein said at least one of said plurality of paths is protected and at least one of said plurality of paths is unprotected.

3. The method of claim 1 wherein said first hierarchical layer comprises STS-1 communications and said second hierarchical layer comprises OC-n communications.

4. The method of claim 1 wherein said first hierarchical layer comprises VT1.5 communications and said second hierarchical layer comprises STS-1 communications.

5. The method of claim 1 further comprising:
   pre-configuring which ones of said plurality of paths are protected.

6. The method of claim 1 further comprising:
   pre-configuring protection routes for said plurality of protected paths.

7. In a mesh network that employs a hierarchical digital transmission standard, apparatus for operating a node to handle link failure, said apparatus comprising:
   means for detecting failure of a data communication link at a second hierarchical layer, wherein said link is employed by a plurality of paths defined at a first hierarchical layer above said second hierarchical layer;
   means for signaling local repair of said failure using overhead information of said second hierarchical layer only without flooding throughout said mesh network; and means for switching only protected ones of said plurality of paths to alternate routes through said network to avoid said failure.

8. The apparatus of claim 7 wherein said first hierarchical layer comprises STS-1 communications and said second hierarchical layer comprises OC-n communications.

9. The apparatus of claim 7 wherein said first hierarchical layer comprises VT1.5 communications and said second hierarchical layer comprises STS-1 communications.

10. The apparatus of claim 7 further comprising:
means for pre-configuring which ones of said plurality of paths are protected.

11. The apparatus of claim 7 further comprising:
means for pre-configuring protection routes for said plurality of protected paths.

12. The apparatus of claim 7 wherein said at least one of said plurality of paths is protected and at least one of said plurality of paths is unprotected.

13. In a network that employs a hierarchical digital transmission standard, apparatus for operating a node to handle link failure, said apparatus comprising:
a processor;
a memory storing instructions for execution by said processor, said instructions comprising:
code that causes detection of failure of a data communication link defined at a second hierarchical layer, wherein said link is employed by a plurality of paths defined at a first hierarchical layer above said second hierarchical layer;
code that causes signaling of local repair of said failure using overhead information of said second hierarchical layer; and
code that causes switching of only protected ones of said plurality of paths to alternate routes through said network to avoid said failure.

14. The apparatus of claim 13 wherein said network comprises a mesh network.

15. The apparatus of claim 14 wherein said code that causes signaling comprises:
code that causes signaling without flooding throughout said mesh network.

16. The apparatus of claim 14 wherein said at least one of said plurality of paths is protected and at least one of said plurality of paths is unprotected.

17. The apparatus of claim 14 wherein said first hierarchical layer comprises STS-1 communications and said second hierarchical layer comprises OC-n communications.

18. The apparatus of claim 14 wherein said first hierarchical layer comprises VT1.5 communications and said second hierarchical layer comprises STS-1 communications.

19. The apparatus of claim 14 wherein said instructions further comprise:
code that causes preconfiguration of which ones of said plurality of paths are protected.

20. The apparatus of claim 14 wherein said instructions further comprise:
code that causes preconfiguration of protection routes for said plurality of protected paths.

21. In a network that employs a hierarchical digital transmission standard, a computer program product for operating a node to handle link failure, said computer program product comprising:
code that causes detection of failure of a data communication link defined at a second hierarchical layer, wherein said link is employed by a plurality of paths defined at a first hierarchical layer above said second hierarchical layer;
code that causes signaling of local repair of said failure using overhead information of said second hierarchical layer below said first hierarchical layer;
code that causes switching of only protected ones of said plurality of paths to alternate routes through said network to avoid said failure; and
a computer-readable storage medium that stores the codes.

22. In a mesh network that employs a hierarchical digital transmission standard, a method of operating a node to handle link failure, said method comprising:
detecting failure of a data communication link at a second hierarchical layer, wherein said link is employed by a plurality of paths defined at a first hierarchical layer above said second hierarchical layer;
signaling local repair of said failure using overhead information of said second hierarchical layer without flooding throughout said mesh network; and
switching only protected ones of said plurality of paths to alternate routes through said network to avoid said failure.

23. In a mesh network that employs a hierarchical digital transmission standard, a method of operating a node to handle link failure, said method comprising:
detecting failure of a data communication link at a second hierarchical layer comprising STS-1 communications, wherein said link is employed by a plurality of paths defined at a first hierarchical layer comprising VT1.5 communications above said second hierarchical layer;
signaling local repair of said failure using overhead information of said second hierarchical layer; and
switching only protected ones of said plurality of paths to alternate routes through said network to avoid said failure.

24. In a network that employs a hierarchical digital transmission standard, a method of operating a node to handle link failure, said method comprising:
detecting failure of a data communication link at a second hierarchical layer, wherein said link is employed by a plurality of paths defined at a first hierarchical layer above said second hierarchical layer;
signaling local repair of said failure using overhead information of said second hierarchical layer;
pre-configuring which ones of said plurality of paths are protected; and
switching only protected ones of said plurality of paths to alternate routes through said network to avoid said failure.

25. In a network that employs a hierarchical digital transmission standard, a method of operating a node to handle link failure, said method comprising:
detecting failure of a data communication link at a second hierarchical layer, wherein said link is employed by a plurality of paths defined at a first hierarchical layer above said second hierarchical layer;
signaling local repair of said failure using overhead information of said second hierarchical layer;
pre-configuring protection routes for said plurality of protected paths; and
switching only protected ones of said plurality of paths to protection routes through said network to avoid said failure.

26. In a mesh network that employs a hierarchical digital transmission standard, apparatus for operating a node to handle link failure, said apparatus comprising:
means for detecting failure of a data communication link at a second hierarchical layer, wherein said link is employed by a plurality of paths defined at a first hierarchical layer above said second hierarchical layer;

means for signaling local repair of said failure using overhead information of said second hierarchical layer signaling without flooding throughout said mesh network; and means for switching only protected ones of said plurality of paths to alternate routes through said network to avoid said failure.

27. In a network that employs a hierarchical digital transmission standard, apparatus for operating a node to handle link failure, said apparatus comprising:

means for detecting failure of a data communication link at a second hierarchical layer comprising STS-1 communications, wherein said link is employed by a plurality of paths defined at a first hierarchical layer comprising VT1.5 communications above said second hierarchical layer;

means for signaling local repair of said failure using overhead information of said second hierarchical layer; and means for switching only protected ones of said plurality of paths to alternate routes through said network to avoid said failure.

28. In a network that employs a hierarchical digital transmission standard, apparatus for operating a node to handle link failure, said apparatus comprising:

means for detecting failure of a data communication link at a second hierarchical layer, wherein said link is employed by a plurality of paths defined at a first hierarchical layer above said second hierarchical layer;

means for signaling local repair of said failure using overhead information of said second hierarchical layer;

means for pre-configuring which ones of said plurality of paths are protected; and means for switching only protected ones of said plurality of paths to alternate routes through said network to avoid said failure.

29. In a network that employs a hierarchical digital transmission standard, apparatus for operating a node to handle link failure, said apparatus comprising:

means for detecting failure of a data communication link at a second hierarchical layer, wherein said link is employed by a plurality of paths defined at a first hierarchical layer above said second hierarchical layer;

means for signaling local repair of said failure using overhead information of said second hierarchical layer;

means for pre-configuring protection routes for said plurality of protected paths; and means for switching only protected ones of said plurality of paths to protection routes through said network to avoid said failure.

* * * * *